(12) United States Patent
Liu et al.

(10) Patent No.: US 12,204,551 B2
(45) Date of Patent: Jan. 21, 2025

(54) SYSTEM AND METHOD FOR MINING DATA AND STORAGE MEDIUM

(71) Applicant: BEIJING BAIDU NETCOM SCIENCE AND TECHNOLOGY CO., LTD., Beijing (CN)

(72) Inventors: Ji Liu, Beijing (CN); Haoyi Xiong, Beijing (CN); Dejing Dou, Beijing (CN); Siyu Huang, Beijing (CN); Jizhou Huang, Beijing (CN); Zhi Feng, Beijing (CN); Haozhe An, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 852 days.

(21) Appl. No.: 17/249,939

(22) Filed: Mar. 19, 2021

(65) Prior Publication Data

US 2021/0248139 A1 Aug. 12, 2021

(30) Foreign Application Priority Data

Apr. 26, 2020 (CN) .......................... 202010339533.8

(51) Int. Cl.
*G06F 16/24* (2019.01)
*G06F 16/2458* (2019.01)
*G06F 21/53* (2013.01)

(52) U.S. Cl.
CPC .......... *G06F 16/2465* (2019.01); *G06F 21/53* (2013.01); *G06F 2216/03* (2013.01); *G06F 2221/034* (2013.01)

(58) Field of Classification Search
CPC .. G06F 16/2465; G06F 21/53; G06F 2216/03; G06F 2221/034; G06F 21/74;
(Continued)

(56) References Cited

U.S. PATENT DOCUMENTS

| 2010/0037296 A1* | 2/2010 | Silverstone ......... G06F 9/45558 718/1 |
| 2014/0040890 A1* | 2/2014 | Novak .................... G06F 21/53 718/1 |

(Continued)

FOREIGN PATENT DOCUMENTS

| CN | 105930731 A | 9/2016 |
| CN | 108563492 A | 9/2018 |

(Continued)

OTHER PUBLICATIONS

Office Action for Japanese Application No. 2021-049847, dated Jan. 11, 2022, 3 pages.

(Continued)

*Primary Examiner* — Pierre M Vital
*Assistant Examiner* — Andrew N Ho
(74) *Attorney, Agent, or Firm* — Lippes Mathias LLP

(57) ABSTRACT

Embodiments of the present disclosure provide a data mining system, a data mining method, and a storage medium. The data mining system includes a transfer device, a first trusted execution space and a second trusted execution space. The transfer device is configured to receive a data calling request of the second trusted execution space, obtain data to be called from the first trusted execution space according to the data calling request, and provide the data to be called to the second trusted execution space, so as to perform data mining based on the data to be called and the mining-related data to obtain a data mining result and to provide the data mining result to a device of the data user.

9 Claims, 5 Drawing Sheets

(58) Field of Classification Search
CPC ... G06F 16/24561; Y02D 10/00; H04L 63/10; G16H 50/70; G16H 50/80
See application file for complete search history.

(56) References Cited

U.S. PATENT DOCUMENTS

| | | | |
|---|---|---|---|
| 2014/0075502 A1* | 3/2014 | Aissi | G06F 21/60 726/1 |
| 2017/0187748 A1* | 6/2017 | Durand | H04L 63/1475 |
| 2017/0201528 A1* | 7/2017 | Kim | H04W 12/06 |
| 2017/0214550 A1 | 7/2017 | Equinix | |
| 2017/0317984 A1 | 11/2017 | Ollikainen et al. | |
| 2017/0372226 A1 | 12/2017 | Costa et al. | |
| 2019/0095879 A1 | 3/2019 | Eyal et al. | |
| 2019/0098019 A1* | 3/2019 | Coleman | G06F 21/53 |
| 2019/0158594 A1 | 5/2019 | Shadmon et al. | |
| 2020/0089892 A1* | 3/2020 | Ojha | G06Q 50/01 |

FOREIGN PATENT DOCUMENTS

| | | | |
|---|---|---|---|
| CN | 110034924 A | | 7/2019 |
| CN | 110213346 A | | 9/2019 |
| CN | 110275908 A | | 9/2019 |
| JP | 2016189138 A | * | 11/2016 |
| JP | 2016192126 A | * | 11/2016 |
| JP | 2017520068 A | | 7/2017 |
| JP | 2018156293 A | | 10/2018 |
| JP | 2019021055 A | | 2/2019 |
| JP | 2020014153 A | | 1/2020 |

OTHER PUBLICATIONS

Office Action in CN202010339533.8, dated Dec. 28, 2022, 9 pages.
Extended European Search Report for Application No. 21164620.3, dated Sep. 13, 2021, 7 pages.
Office Action for Japanese Patent Application No. 2021-049847, dated Oct. 17, 2023, 36 pages.

* cited by examiner

| Bucket suffix | Application | Corresponding prefix | Overseas | | intra-domain | | | |
|---|---|---|---|---|---|---|---|---|
| | | | Data provider | | Data user | | Auditor | |
| | | | Read | write | Read | write | Read | write |
| -datasre+3 | uploading raw data outside the domain | Project + partner name | | | | | | |
| -lobcode+3 | uploading scripts and programs outside the domain | Project + partner name | | | | | | |
| -baidudatasre+3 | uploading Baidu raw data inside the domain | Project | | | | | | |
| -mockdatasre+3 | uploading generated data inside the domain | Project | | | | | | |
| -inside+3 | storing intermediate results/intra-domain code inside the domain | Project + partner name | | | | | | |
| -output+3 | outputting intra-domain result data | Project + partner name | | | | | | |
| -review+3 | outputting results to be released, and saving file | Project + partner name | | | | | | |
| -download+3 | releasing after review inside the domain, downloading outside the domain | Project + partner name | | | | | | |

FIG.4

SYSTEM AND METHOD FOR MINING DATA AND STORAGE MEDIUM

CROSS-REFERENCE TO RELATED APPLICATION

The present application is based upon and claims priority to Chinese Patent Application No. 202010339533.8, filed on Apr. 26, 2020, the entirety contents of which are incorporated herein by reference.

TECHNICAL FIELD

The present disclosure relates to a field of data processing technologies, specifically a field of data mining technologies, and more particularly, to a data mining system, a data mining method, and a computer-readable storage medium.

BACKGROUND

Currently, a large amount of data modeling adopted is widely used to predict future trend of some events. For example, infectious disease epidemics is predicted by scientific research institutions.

SUMMARY

Embodiments of the present disclosure provide a data mining system, a data mining method, and a computer-readable storage medium.

Embodiments of the present disclosure provide a data mining system. The data mining system includes: a transfer device, a first trusted execution space and a second trusted execution space. Only the transfer device has an access permission to the first trusted execution space and the second trusted execution space. The first trusted execution space is configured to store available data of a data provider. The second trusted execution space is configured to store mining-related data of a data user. The transfer device is configured to receive a data calling request of the second trusted execution space, obtain data to be called from the first trusted execution space according to the data calling request, and provide the data to be called to the second trusted execution space, so as to perform data mining based on the data to be called and the mining-related data to obtain a data mining result and to provide the data mining result to a device of the data user.

Embodiments of the present disclosure provide a data mining method. The data mining method is applied to a second trusted execution space corresponding to a data user. The method includes: sending a data calling request to a first trusted execution space corresponding to a data provider through a transfer device, and the data calling request including an identifier of the data user and an identifier of data to be called; obtaining the data to be called returned by the first trusted execution space when the data provider has a permission to call the data to be called; determining a data mining result based on the data to be called and the mining-related data of the data provider; and providing the data mining result to a device of the data user through the transfer device.

Embodiments of the present disclosure provide a non-transitory computer-readable storage medium storing computer instructions, the computer instructions are used to make the computer implement a data mining method. The data mining method is applied to a second trusted execution space corresponding to a data user. The method includes: sending a data calling request to a first trusted execution space corresponding to a data provider through a transfer device, and the data calling request including an identifier of the data user and an identifier of data to be called; obtaining the data to be called returned by the first trusted execution space when the data provider has a permission to call the data to be called; determining a data mining result based on the data to be called and the mining-related data of the data provider; and providing the data mining result to a device of the data user through the transfer device.

It should be understood that the content described in this section is not intended to identify key or important features of the embodiments of the present disclosure, nor is it intended to limit the scope of the present disclosure. Additional features of the present disclosure will be easily understood through the following description.

BRIEF DESCRIPTION OF THE DRAWINGS

The accompanying drawings are used to better understand the solution, and do not constitute a limitation on the present disclosure, in which:

FIG. 4 is a schematic diagram of storage structure of a storage cluster at storage interval.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

In real application scenarios, due to the limitation of data privacy protection, existing models established by many institutions, organizations, or enterprises lack sufficient support of relevant data, resulting in low prediction accuracy.

A data mining system, a data mining method, a data mining apparatus, an electronic device and a computer-readable storage medium according to the embodiments of the present disclosure are described below with reference to the accompanying drawings.

Figure 1:
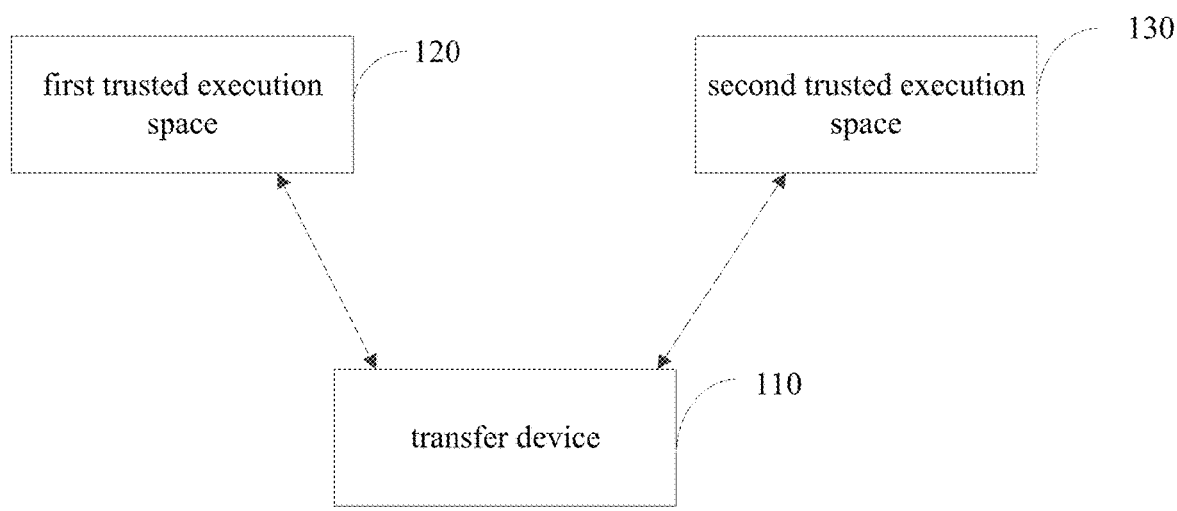
FIG. 1 is a schematic diagram according to Embodiment 1 of the present disclosure.

FIG. 1 is a schematic diagram according to Embodiment 1 of the present disclosure. As illustrated in FIG. 1, the data mining system includes: a transfer device 110, a first trusted execution space 120 and a second trusted execution space 130.

Only the transfer device 110 has an access permission to the first trusted execution space and the second trusted execution space. The first trusted execution space 120 is configured to store available data of a data provider. The second trusted execution space 130 is configured to store mining-related data of a data user. The transfer device 110 is configured to receive a data calling request of the second trusted execution space 130, obtain data to be called from the first trusted execution space 120 according to the data calling request, and provide the data to be called to the second trusted execution space, so as to perform data mining based on the data to be called and the mining-related data to obtain a data mining result and to provide the data mining result to a device of the data user. It should be noted that, since the first trusted execution space and the second trusted execution space have storage and computing functions, the first trusted execution space and the second trusted execution space may each include, but are not limited to, storage clusters and computing clusters. The available data may include a plurality of pieces of data and permission information for each piece of data. For example, whether each piece of data is readable and writable. Mining-related data may include, but is not limited to, data prepared by the data user for event prediction, program files and models related to the event prediction.

Figure 2:
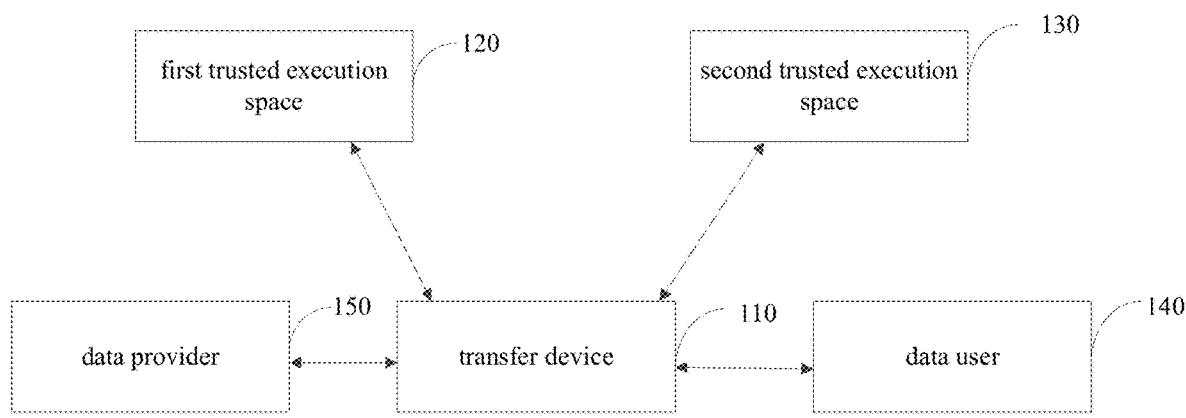
FIG. 2 is a schematic diagram according to Embodiment 2 of the present disclosure.

In order to obtain credible protection of security and privacy of data, as illustrated in FIG. 2, on the basis of FIG. 1, the transfer device 110 is connected to a device 140 of a data user to obtain data sent by the device 140. The mining-related data is sent to the second trusted execution space 130 for storage. The transfer device 110 is connected with a device 150 of a data provider to obtain the available data sent by the device 150, and send the available data to the first trusted execution space 120 for storage.

For example, before sending the mining-related data to the second trusted execution space for storage, the transfer device obtains attribute information of the mining-related data, and determines whether the second trusted execution space is in an idle state. A new second trusted execution space for the data user is created according to the attribute information when the second trusted execution space is in a non-idle state, and the mining-related data is transmitted to the new second trusted execution space for storage. When the second trusted execution space is in an idle state, the mining-related data is stored according to the attribute information. For example, when the second trusted execution space is in a non-idle state, that is, when there is no free space in the second trusted execution space, the transfer device creates a new second trusted execution space based on a calculation amount of the mining-related data and a size of the data, the mining-related data is sent to the new second trusted execution space for storage. When the second trusted execution space is in an idle state, the required storage space is determined according to the calculation amount of data and the size of the data to store the mining-related data. As a result, the mining-related data is stored according to the attribute information of the mining-related data and the state of the second trusted execution space, which enables the mining-related data to be better stored in the second trusted execution space and avoids waste of related storage resources. In addition, the transfer device may also determine a service life of the new second trusted execution space, and destroy the new second trusted execution space when the service life of the new second trusted execution space expires.

Meanwhile, the transfer device could can also determine a service life (for example, 6 months) of the first trusted execution space and a service life of the second trusted execution space. When the service life of first trusted execution space expires, content in the first trusted execution space is cleared. Content in the second trusted execution space is cleared when the service life of the second trusted execution space expires. Thus, security of the data stored in the first trusted execution space and the second trusted execution space is guaranteed.

In order to realize available but invisible, calculable but non-copyable operations of the data provided by the device of the data user to the device of the data provider, data security is ensured. In the embodiments of this disclosure, the second trusted execution space is used to call the available data in the first trusted execution space through the transfer device, the available data and the mining-related data are combined to determine a data mining result, and the data mining result is provided to the device of the data user through the transfer device.

For example, the second trusted execution space may send a data calling request to the first trusted execution space through the transfer device to call the available data in the first trusted execution space. The data calling request may include, but is not limited to, an identifier of the data user, an identifier of the data provider and an identifier of the data to be called. The first trusted execution space is configured to determine whether the data user has a permission to call the data to be called based on the identifier of the data user, the identifier of the data to be called, and the permission information of each piece of data in the data calling request. When the data user has the permission to call the data to be called, the data to be called is returned to the second trusted execution space through the transfer device.

In other word, in the case of ensuring data security, it is more convenient to call the available data in the first trusted execution space, and the second trusted execution space sends the data calling request to the first trusted execution space through the transfer device. The first trusted execution space determines whether the data user has the permission to call the data to be called according to the identifier of the data user, the identifier of the data to be called, and the permission information of each piece of data in the data calling request. When it is determined that the data user has the permission to call the data to be called, the data to be called can be returned to the second trusted execution space through the transfer. When it is determined that the data user does not have the permission to call the data to be called, the transfer device may return the data to be called to the second trusted execution space. When it is determined that the data user does not have the permission to call the data to be called, the transfer device may return the data to be called to the second trusted execution space.

It should be understood that, in order to save computing resources, in this embodiment of the present disclosure, a corresponding relation between the identifier of the data user and the permission of data provider to the data is preset, and the transfer device could determine whether to forward the corresponding data calling request according to the identifier of the data user in the data calling request. For example, if the transfer device determines that the data user does not have the permission to call the data of the data provider according to the identifier of the data user, the data calling request is not forwarded. In addition, in order to better protect the data security, there may be a plurality of the first trusted execution spaces, each first trusted execution space corresponds to one data provider, and there may be a plurality of the second trusted execution spaces, and each second trusted execution space corresponds to one data user. Therefore, the transfer device sends the data calling request to the corresponding first trusted execution space based on the identifier of the data provider in the data calling request. Meanwhile, when the transfer device provides the data to be called to the second trusted execution space, the data to be called is provided to a corresponding second trusted execution space according to the identifier of the data user in the data calling request. It should be noted that in the case that the data of the data provider and the data of the data user are the same, if the data provider and the data user both need to use the data provided by each other, at this time, the data provider is the data user, the data user act as the data provider.

In the embodiments of the present disclosure, the second trusted execution space combines the mining-related data provided by the data user with the available data of the first trusted execution space returned by the transfer device to determine the data mining result. For example, the related data is mined for a data prediction model, and the second trusted execution space provides data input into the data prediction model, and the result output by the model is determined as the data mining result. It should be noted that the data mining result may include, but is not limited to, at least one mining result and permission information of each mining result.

Optionally, the second trusted execution space is configured to receive the mining result acquisition request sent by the device of the user through the transfer device. The mining result acquisition request includes: the identifier of the data user and an identifier of a mining result to be obtained. It is determined whether the data user has the permission to obtain the mining result to be obtained based on the identifier of the data user, the identifier of the mining result to be obtained, and the permission information of each mining result. When the data user has the permission to obtain the mining result to be obtained, the mining result to be obtained is sent to the device of the data user through the transfer device. As a result, the data user can obtain data mining results in a timely manner and better integrate the mining results.

In other words, the device of the data user sends a mining result acquisition request to the second trusted execution space through the transfer device, and the second trusted execution space determines whether the data user has permission to obtain the mining results to be obtained based on the identifier of the data user in the mining result acquisition request, the identifier of the mining result to be obtained, and the permission information for each mining result. When the data user has the permission to obtain the mining result to be obtained, the second trusted execution space sends the mining result to be obtained to the data user device through the transfer device. When the data user does not have the permission to obtain the mining result to be obtained, the second trusted execution space may send a prompt message to the device of the data user that the device of the data user does not have the permission to obtain the mining result to be obtained.

In addition, in this embodiment of the disclosure, the corresponding relation between the identifier of the data user and the permission of the mining result to be obtained is preset, and the transfer device determines whether to forward the corresponding mining result acquisition request in the mining result acquisition request based on the identifier of the data user. For example, if the transfer device determines that the data user does not have the permission to obtain the mining result to be obtained based on the identifier of the data user, and the mining result acquisition request is not forwarded.

In order to enable the data mining system to be scalable and easily managed, the data mining system is set on a server cluster, where the server cluster may include but is not limited to at least one server. The first trusted execution space and the second trusted execution space may be set on at least one virtual machine in the server cluster, and the transfer device may be a virtual machine in the server cluster.

It should be noted that since the first trusted execution space and the second trusted execution space have computing and storage functions, it is necessary for the virtual machine to have computing and storage functions, and each server has computing and storage functions. One virtual machine could use the computing function of one server and the storage function of another server. Therefore, the first trusted execution space and the second trusted execution space are set on at least one virtual machine in the server cluster.

In order to better illustrate the above-mentioned embodiments, examples are now described.

Figure 3:
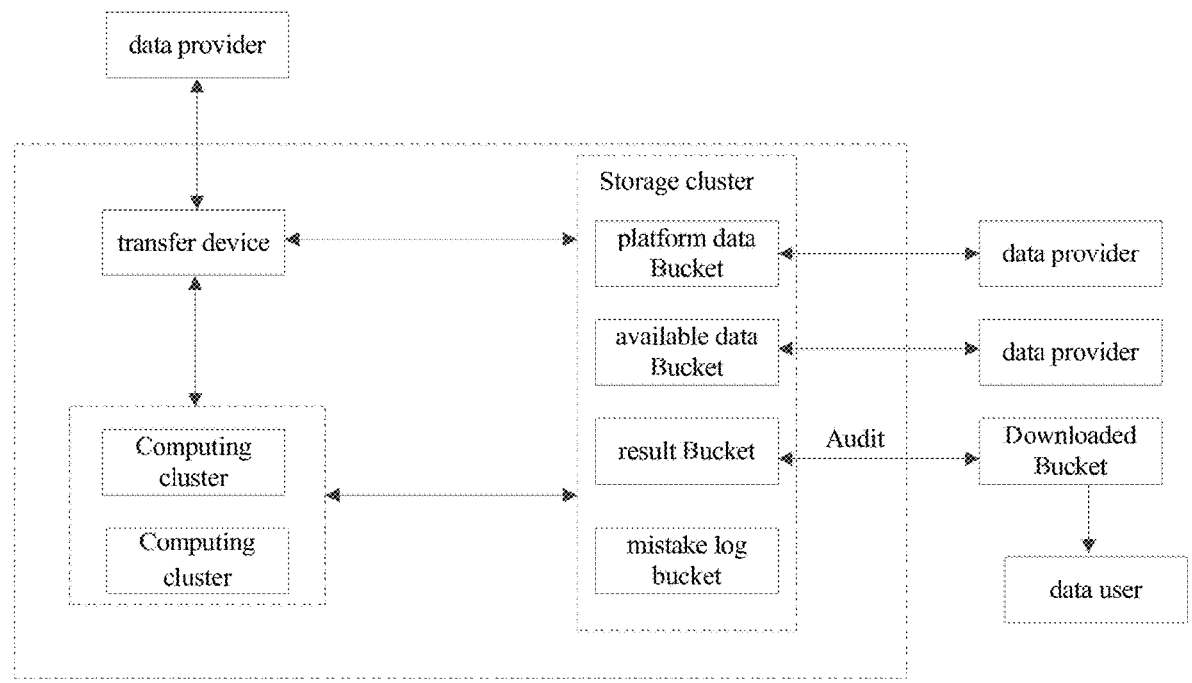
FIG. 3 is a schematic diagram of a data mining system according to an embodiment of the present disclosure.

For example, FIG. 3 is a schematic diagram of a data mining system according to an embodiment of the present disclosure. In FIG. 3, the data mining system may include: a transfer machine, a computing cluster and a storage cluster. The storage cluster is divided into different buckets (storage sections). Buckets are configured to store system data provided by the data provider and the available data, data results determined based on the data provided by the data user, script data, and abnormal information. In order to facilitate storage and search of data, as illustrated in FIG. 4, Buckets are stored according to Bucket suffix names, purpose of the data, corresponding prefixes, and outside and inside domain. The transfer device could obtain the mining-related data from the data user and send the mining-related data to the storage cluster. The storage cluster and the computing cluster could directly communicate with each other. The computing cluster performs calculations based on the data provided by the data provider to obtain the data mining results. For example, a data training model is provided by the data provider, and the data is input into the data training model to obtain a model training result. The data user sends a mining result acquisition request to the storage cluster through the transfer device, and calculates an audit result through the computing cluster. After the audit is passed, the data user downloads the mining result. It should be noted that output modes of the mining data results are different, and the ways that data user downloads the mining data results in the Buckets are also different. For example, the mining data result is a single data output, the storage cluster moves the data mining result to the downloaded bucket, and the data user can download the data mining result directly. For example, the mining data result is routine data output, and the data mining results could be encapsulated as an online service interface by the storage cluster, and the interface parameter configuration is exposed to the data user, and the data user can obtain the data mining results in the form of online calling.

In order to ensure data security, storage clusters are protected in different ways. For example, different users have different read and write permissions for Buckets (for example, 0 means forbidden, 1 means allowed) within and outside the domain, different accounts and passwords are set for different users to distinguish. For another example, when accessing the storage system of the storage cluster inside and outside the domain, a specific Internet Protocol (IP) is required. For another example, the data user and the storage system of the storage cluster is connected through a dedicated line. Meanwhile, users can only log in to the transfer device through the web (World Wide Web) service, and the web terminal does not provide any upload and download functions. In addition, the security of the transfer device is controlled by a security group. Only users who provide a fixed exit IP can access the transfer device in the domain. Other servers in the domain (storage clusters, computing clusters) have no external network authority, that is, other servers in the domain cannot access the external network and cannot be accessed by the external network. It should be noted that, in the embodiments of this disclosure, the computing cluster may initially consist of one cloud virtual machine server. If the computing amount needs to be increased, a number of cloud virtual machine servers is increased, which is not specifically limited in this disclosure.

The data mining system according to the embodiments includes a transfer device, a first trusted execution space and a second trusted execution space. Only the transfer device has an access permission to the first trusted execution space and the second trusted execution space. The first trusted execution space is configured to store available data of a data provider. The second trusted execution space is configured to store mining-related data of a data user. The transfer device is configured to receive a data calling request of the second trusted execution space, obtain data to be called from the first trusted execution space according to the data calling request, and provide the data to be called to the second trusted execution space, so as to perform data mining based on the data to be called and the mining-related data to obtain a data mining result and to provide the data mining result to a device of the data user. The data mining system could call the available data in the first trusted execution space through the transfer device, and determine the data mining result based on the available data and the mining-related data, and provide the mining result to the device of the data user. Therefore, under the premise of ensuring data privacy, the data user is provided with a large amount of data for event prediction, which improves the prediction accuracy.

Figure 5:
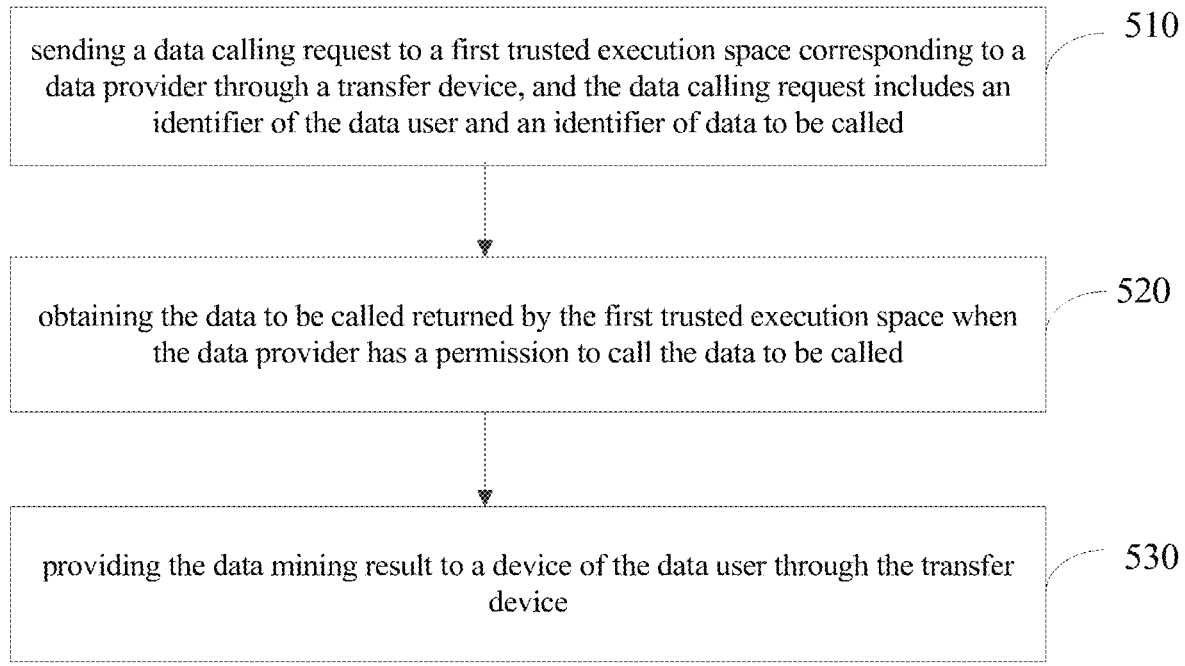
FIG. 5 is a schematic diagram according to Embodiment 3 of the present disclosure.

In order to implement the above embodiments, this disclosure provides a data mining method. FIG. 5 is a schematic diagram according to Embodiment 3 of the present disclosure. As illustrated in FIG. 5, the data mining method is applied to a second trusted execution space corresponding to a data user. The method includes the following steps.

At block 501, a data calling request is sent to a first trusted execution space corresponding to a data provider through a transfer device, and the data calling request includes an identifier of the data user and an identifier of data to be called.

In the embodiments of the disclosure, the second trusted execution space may send the data calling request to the first trusted execution space through the transfer device to call the available data in the first trusted execution space. The data calling request may include, but is not limited to, the identifier of the data user, the identifier of the data provider, the identifier of the data to be called.

At block 502, the data to be called returned by the first trusted execution space is obtained when the data provider has a permission to call the data to be called.

Next, the first trusted execution space determines whether the data user has the permission to call the data to be called based on the identifier of the data user, the identifier of the data to be called, and the permission information of each piece of data in the data calling request. When it is determined that the data user has the permission to call the data to be called, the data to be called is returned to the second trusted execution space through the transfer device. When it is determined that the data user does not have the permission to call the data to be called, the transfer device may return a prompt message to the second trusted execution space that the data user does not have the permission to call the data to be called.

At block 503, a data mining result is provided to a device of the data user through the transfer device.

In the embodiments of the present disclosure, the second trusted execution space combines the mining-related data of the data provider with the available data of the first trusted execution space returned by the transfer device to determine the data mining result. For example, the mining-related data is a data prediction model, and the second trusted execution space data input the data into the data prediction model, and an output result of the model is used as the data mining result. It should be noted that the data mining result may include, but is not limited to, at least one mining result and the permission information of each piece of the mining result.

Next, the device of the data user sends a mining result acquisition request to the second trusted execution space through the transfer device, and the second trusted execution space determines whether the data user has access to the mining result to be obtained according to the identifier of the data user, the identifier of the mining result to be obtained, and the permission information of each piece of the mining result in the mining result acquisition request. When the data user has the permission to obtain the mining result to be obtained, the second trusted execution space returns the mining result to be obtained to the device of the data user through the transfer device, when the data user does not have the permission to the mining result to be obtained, the second trusted execution space may send to the device of the data user a prompt message that the device of the data user does not have the permission to obtain the mining result to be obtained.

The data mining method according to the embodiments of the disclosure is applied to the second trusted execution space corresponding to the data user, and a data calling request is sent to the first trusted execution space corresponding to the data provider through the transfer device. The data calling request includes: an identifier of the data user and an identifier of the data to be called. When the data provider has the permission to call the data to be called, the data to be called returned by the first trusted execution space is obtained. The data mining result is determined by combining the data to be called and the mining-related data of the data provider. The data mining result is provided to the device of the data user through the transfer device. The method provides the available data in the first trusted execution space to the second trusted execution space through the transfer device. The second trusted execution space determines the data mining result based on the available data and the mining-related data, and transfers the data through the transfer device. The mining result is provided to the device of the data user, thus, on the premise of ensuring data privacy, a large amount of data is provided for the data user to predict the event, and the prediction accuracy is improved.

In order to implement the above embodiments, this disclosure also provides a data mining apparatus.

Figure 6:
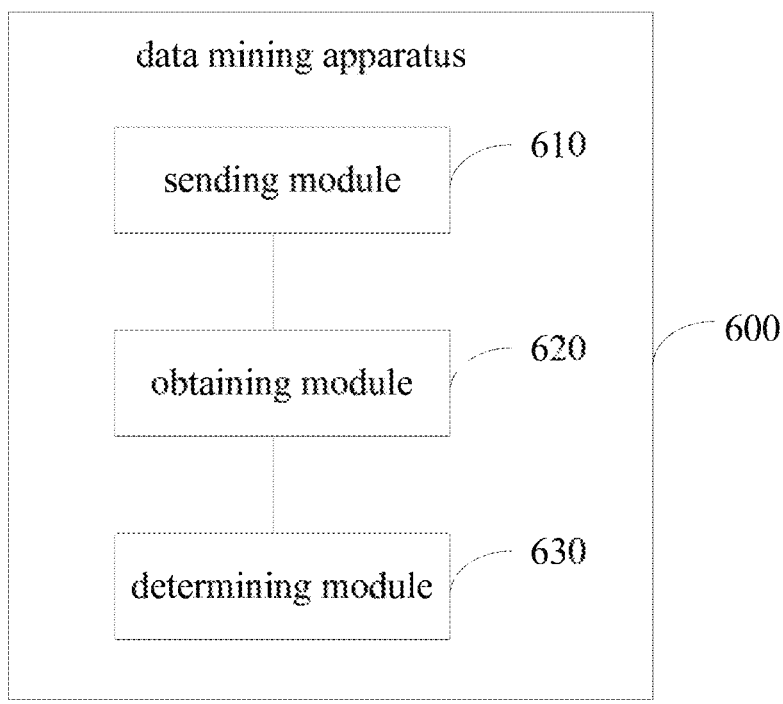
FIG. 6 is a schematic diagram according to Embodiment 4 of the present disclosure.

FIG. 6 is a schematic diagram according to Embodiment 4 of the present disclosure. As illustrated in FIG. 6, a data mining apparatus 600 is applied to the second trusted execution space corresponding to the data user. The data mining apparatus 600 includes: a sending module 610, an obtaining module 620, and a determining module 630.

The sending module 610 is configured to send a data calling request to a first trusted execution space corresponding to a data provider through a transfer device, and the data calling request includes an identifier of the data user and an identifier of data to be called. The obtaining module 620 is configured to obtain the data to be called returned by the first trusted execution space when the data provider has a permission to call the data to be called. The determining module 630 is configured to provide the data mining result to a device of the data user through the transfer device.

The data mining apparatus according to the embodiments of the present disclosure is applied to the second trusted execution space corresponding to the data user, and the data calling request is sent to the first trusted execution space corresponding to the data provider through the transfer device. The data calling request includes: an identifier of data user and an identifier of the data to be called. When the data provider has the permission to call the data to be called, the data to be called is returned by the first trusted execution space. The data to be called and the mining-related data of the data provider are combined to determine a data mining result. The data mining result is sent to the device of the data user through the transfer device. The apparatus provides the available data in the first trusted execution space to the second trusted execution space through the transfer device. The second trusted execution space determines the data mining result based on the available data and the mining-related data, and provides the mining results to the device of the data user through the device. Thus, on the premise of ensuring data privacy, a large amount of data is provided for the data user to predict the event, which improves the prediction accuracy.

According to the embodiments of the present disclosure, the disclosure also provides an electronic device and a readable storage medium.

Figure 7:
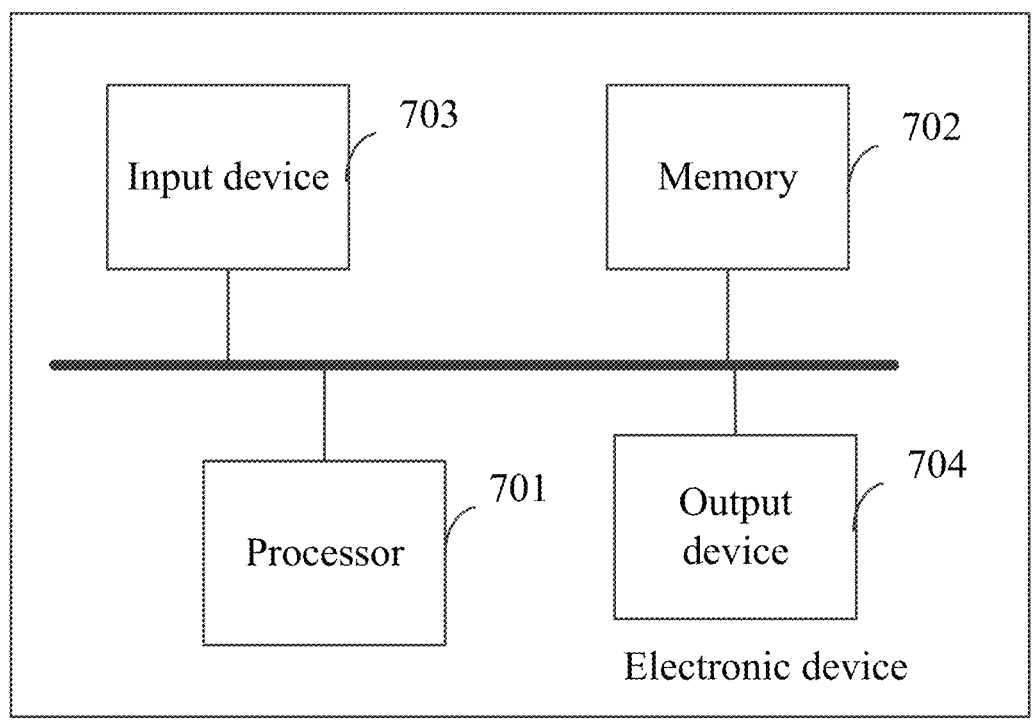
FIG. 7 is a block diagram of an electronic device used to implement the data mining method according to an embodiment of the present disclosure.

FIG. 7 is a block diagram of an electronic device used to implement the data mining method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 7.

The memory 702 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules (for example, the sending module 610, the obtaining module 620, and the determining module 630 shown in FIG. 6) corresponding to the method in the embodiment of the present disclosure. The processor 701 executes various functional applications and data processing of the server by running non-transitory software programs, instructions, and modules stored in the memory 702, that is, implementing the method in the foregoing method embodiments.

The memory 702 may include a storage program area and a storage data area, where the storage program area may store an operating system and application programs required for at least one function. The storage data area may store data created according to the use of the electronic device for implementing the method. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A data mining system comprising a transfer party, a first trusted memory and calculator and a second trusted memory and calculator, wherein the data mining system is set on a server cluster, and the server cluster comprises at least one server, the first trusted memory and calculator and the second trusted memory and calculator are set on at least one virtual machine in the server cluster, and the transfer party is a virtual machine in the server cluster;
   wherein only the transfer party has an access permission to the first trusted memory and calculator and the second trusted memory and calculator;
   the transfer party is configured to be connected to a device of a data user, and is configured to obtain mining-related data sent by the device of the data user and to send the mining-related data to the second trusted memory and calculator for storage;
   the transfer party is configured to be connected to a device of a data provider, and is configured to obtain available data sent by the device of the data provider, and to send the available data to the first trusted memory and calculator for storage; and
   the transfer party is configured to receive a data calling request of the second trusted memory and calculator, obtain data to be called from the first trusted memory and calculator according to the data calling request, and provide the data to be called to the second trusted memory and calculator, such that the second trusted memory and calculator performs data mining based on the data to be called and the mining-related data to determine a data mining result, and the transfer party obtains the data mining result and provides the data mining result to the device of the data user;
   wherein the transfer party is further configured to obtain attribute information of the mining-related data, create a new second trusted memory and calculator for the data user according to the attribute information when the second trusted memory and calculator is in a non-idle state, and send the mining-related data to the new second trusted memory and calculator for storage.

2. The system according to claim 1, wherein the available data comprises: a plurality of pieces of data and permission information for each piece of data;
   the data calling request comprises: an identifier of the data user and an identifier of the data to be called; and
   the first trusted memory and calculator is configured to determine whether the data user has a permission to call the data to be called based on the identifier of the data user and the identifier of the data to be called in the data calling request, and the permission information for each piece of data; and to return the data to be called to the transfer party when it is determined that the data user has the permission to call the data to be called.

3. The system according to claim 1, wherein the data mining result comprises: at least one mining result and permission information for each mining result;
   the transfer party is configured to receive a mining result acquisition request sent by the device of the data user, and the mining result acquisition request comprises the identifier of the data user and an identifier of a mining result to be obtained;
   determining whether the data user has a permission to acquire the mining result to be obtained based on the identifier of data user, the identifier of the mining result to be obtained, and permission information for each mining result; and sending the mining result to be obtained to the transfer party when the data user has the permission to acquire the mining result to be obtained, so that the transfer party sends the mining result to be obtained to the device of the data user.

4. The system according to claim 1, wherein there are a plurality of the first trusted memories and calculators, and each first trusted memory and calculator corresponds to one data provider; and/or, there are a plurality of the second trusted memories and calculators, and each second trusted memory and calculator corresponds to one data user.

5. The system according to claim 1, wherein the transfer party is configured to:

determine a service life of the first trusted memory and calculator and a service life of the second trusted memory and calculator;

clear content in the first trusted memory and calculator when the service life of the first trusted memory and calculator expires; and clear content in the second trusted memory and calculator when the service life of the second trusted memory and calculator expires.

6. The system according to claim 1, wherein the transfer party is further configured to:

determine a service life of the new second trusted memory and calculator; and destroy the new second trusted memory and calculator when the service life of the new second trusted memory and calculator expires.

7. A data mining method, applied to a second trusted memory and calculator corresponding to a data user, comprising:

sending a data calling request to a first trusted memory and calculator corresponding to a data provider through a transfer party, and the data calling request comprising an identifier of the data user and an identifier of data to be called, wherein only the transfer party has an access permission to the first trusted memory and calculator and the second trusted memory and calculator, the first trusted memory and calculator is configured to store available data of the data provider, the available data is data obtained by the transfer party from a device of a data provider and sent to the first trusted memory and calculator, and the second trusted memory and calculator is configured to store the mining-related data of the data user;

obtaining, via the transfer party, the data to be called returned by the first trusted memory and calculator when the data user has a permission to call the data to be called;

determining a data mining result based on the data to be called and mining-related data of the data user; and providing the data mining result to a device of the data user through the transfer party;

wherein a new second trusted memory and calculator is created for the data user according to attribute information of the mining-related data when the second trusted memory and calculator is in a non-idle state, and the mining-related data is send to the new second trusted memory and calculator for storage.

8. An electronic device, comprising:

at least one processor; and a memory communicatively connected to the at least one processor, wherein the memory stores instructions executable by the at least one processor, and when the instructions are executed by the at least one processor, the at least one processor is enabled to implement the data mining method according to claim 7.

9. A non-transitory computer-readable storage medium storing computer instructions, wherein the computer instructions are used to make the computer implement a data mining method, the method is applied to a trusted memory and calculator corresponding to a data user, and the method comprises:

sending a data calling request to a first trusted memory and calculator corresponding to a data provider through a transfer party, and the data calling request comprising an identifier of the data user and an identifier of data to be called, wherein only the transfer party has an access permission to the first trusted memory and calculator and the second trusted memory and calculator, the first trusted memory and calculator is configured to store available data of the data provider, the available data is data obtained by the transfer party from a device of a data provider and sent to the first trusted memory and calculator, and the second trusted memory and calculator is configured to store the mining-related data of the data user;

obtaining, via the transfer party, the data to be called returned by the first trusted memory and calculator when the data user has a permission to call the data to be called;

determining a data mining result based on the data to be called and mining-related data of the data user; and providing the data mining result to a device of the data user through the transfer party;

wherein a new second trusted memory and calculator is created for the data user according to attribute information of the mining-related data when the second trusted memory and calculator is in a non-idle state, and the mining-related data is send to the new second trusted memory and calculator for storage.

* * * * *